United States Patent Office 3,335,169
Patented Aug. 8, 1967

3,335,169
METHOD OF PREPARING UNSATURATED NITRILES
Jamal S. Eden, Akron, Ohio, assignor to The B. F. Goodrich Company, New York, N.Y., a corporation of New York
No Drawing. Filed Jan. 10, 1966, Ser. No. 519,460
9 Claims. (Cl. 260—465.3)

This is a continuation-in-part of my copending application, Ser. No. 338,604, filed Jan. 20, 1964, now abandoned.

This invention relates to a method of preparing acrylonitrile or methacrylonitrile by ammoxidation of monoolefinic hydrocarbons containing 3 to 4 carbon atoms at an elevated temperature, and more particularly pertains to a method of preparing acrylonitrile or methacrylonitrile by passing vapors of propylene, or isobutylene, ammonia and an oxygen containing gas at a temperature of from about 375° C. to about 500° C. through a catalyst comprising a mixture of a molybdenum oxide, tellurium oxide and a manganese phosphate in a molar ratio of 100 $MoO_3$, 10–100 $TeO_2$, and 5–100 of a manganese phosphate. The catalyst can also be designated as $$Mo_{10}Te_{1-10}Mn_{2-20}P_{2-20}O_{39-120}$$

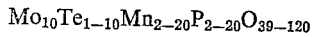

with P being in the form of a phosphate i.e. each P atom it attached to 3 to 4 oxygen atoms.

Nitriles have been prepared by ammoxidation of hydrocarbons, especially from the normally gaseous hydrocarbons. However, prior catalysts and procedures for ammoxidizing propylene or isobutylene to acrylonitrile or methacrylonitrile have shortcomings. The catalysts either have a very short active life, or they convert only a portion of the hydrocarbon to the desired unsaturated derivative per pass, or they oxidize the hydrocarbon excessively to form high proportions of carbon monoxide or carbon dioxide or both or they are not sufficiently selective, so that the hydrocarbon molecule is attacked at both the olefinic unsaturation and at a methyl group, so that large amounts of HCN and acetonitrile are formed.

It is therefore unexpected to find a catalyst that will convert from over 50 to as high as 100% per pass of a monoolefin containing 3 to 4 carbon atoms to yield very high proportions of acrylonitrile or methacrylonitrile. A furether feature is the unusually long active life of the catalyst. Still another feature of the invention is concurrent production of acrylic and methacrylic acid in recoverable amounts along with acrylonitrile and methacrylonitrile.

THE REACTANTS

The essential reactants are propylene or isobutylene, ammonia and an oxygen-containing gas, which can be pure oxygen, oxygen enriched air or air without additional oxygen. For reasons of economy, air is the preferred oxygen-containing reactant.

The addition of steam into the reactor along with the monoolefin, ammonia and an oxygen-containing gas is desirable but not absolutely essential. The function of steam is not clear, but it does seem to reduce the amount of carbon monoxide and dioxide in the effluent gases.

Other diluent gases can be used. Surprisingly, saturated hydrocarbons such as propane or butane are rather inert under the reaction conditions. Nitrogen, argon, krypton or other known inert gases can be used as diluents if desired but are not preferred because of the added cost.

THE CATALYST AND ITS PREPARATION

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

The general procedure for preparing a catalyst from water soluble ingredients is to dissolve the requisite amount of a molybdenum salt, a tellurium salt and a manganese salt in water. Add the requisite amount of phosphoric acid to the manganese salt solution. Add the tellurium salt solution to the molybdenum salt solution and then add the manganese salt-phosphoric acid mixture to the molybdenum-tellurium salt mixture. The catalyst is then dried and baked at 400° C. for about 16 hours.

Supported catalysts can be prepared by adding an aqueous slurry of the support to the aqueous solution of catalyst or the aqueous catalyst ingredients can be added to the slurry of the support.

Alternately a slurry of the catalyst ingredients can be prepared in water, then dried and baked. For supported catalysts the aqueous slurry of the catalyst ingredients can be added to an aqueous suspension of the support or vice versa, and then dried and baked.

A third method is to blend the dry ingredients and then mix them throroughly. The main difficulty is to obtain thorough blending and uniform particle size.

Specific procedures for making catalysts are as follows:
I. (a) Dissolve 105.96 g. of $(NH_4)_6Mo_7O_{24}\cdot 4H_2O$ in 272 ml. water at 50–55° C.

(b) Dissolve 53.76 g. $NH_4TeO_4$ in 900 ml. water at 50–55° C. and add to the molybdate solution with stirring. The mixture may become cloudy but no precipitate is formed.

(c) Dissolve 79.19 g. $MnCl_2\cdot 4H_2O$ in 40 ml. water and add 46.2 g. of 85% $H_3PO_4$ thereto.

Add the mixture described under (c) to the mixture of the ammonium molybdate and ammonium tellurate. No precipitate is formed but the final mixture remains cloudy.

If the catalyst is to remain unsupported, the mixture is evaporated to dryness on a steam bath, heated at 150–200° C. for about an hour and then about 16 hours at 400° C. Then the catalyst is cooled, ground and sieved. For fixed bed systems a 10–18 mesh (U.S. Sieve) size is used. For fluid bed systems the catalyst should be 80–325 mesh (U.S. Sieve).

If the catalyst is to be supported the aqueous solution of ingredients can be added to an aqueous slurry of the support or vice versa, prior to drying. The procedure after drying is the same as that already described.

Thus, to the aqueous catalyst ingredients 240 g. (1.2 mols) of a colloidal silica (Ludox H.S.) are added slowly with stirring. Stirring is continued for about ½ hour prior to drying.

II. This proceduce is a variant of Procedure I.
(a) Prepare a slurry of 43.189 g. $MoO_3$ (99.5% purity).

(b) Make a slurry of 15.961 g. $TeO_2$ (Technical) in water and blend with (a) above.

(c) Dissolve 39.584 g. $MnCl_2.4H_2O$ in water and add 23.1 g. 85% $H_3PO_4$.

Blend this mixture with the slurry of $MoO_3$ and $TeO_2$. Mix thoroughly and then dry and bake, or, if desired, add 120 g. Ludox H.S. to the catalyst before drying.

Another procedure is to add the mixture described under (c) to the Ludox and then add the requisite amount of $TeO_2$ and $MoO_3$ as a slurry.

Also the ingredients can be added to the Ludox individually if desired.

III. In this procedure the ingredients are precipitated on blending.

(a) Dissolve 105.96 g. of ammonium molybdate in water at about 50° C.

(b) Dissolve 31.922 g. TeO$_2$ in concentrated HCl and filter if necessary.

Add the tellurium salt solution to the ammonium molybdate solution. A precipitate forms.

(c) Dissolve 79.168 g. MnCl$_2$.4H$_2$O in water and add 46.2 g. of 85% H$_3$PO$_4$. Add this mixture slowly to the precipitated ammonium molybdate-TeO$_2$ mixture.

Dry on a steam bath and bake for 16 hours at 400° C. Thereafter the catalyst is ground to the desired mesh size and sieved. For supported catalysts an aqueous slurry can be added to the catalyst ingredients or vice versa prior to drying and baking.

IV. The fourth method is to grind MoO$_3$, TeO$_2$ and a manganese phosphate to the proper particle size and then thoroughly mix the dry powders. The mixture can be added to an aqueous slurry of a support or vice versa and thereafter dried and baked.

The exact chemical structure of the catalysts made by the above procedures is not known, but catalysts with molar ratios of 100 Mo, 10–100 Te and 5–100 of a manganese phosphate can be used for oxidizing the monoolefinic hydrocarbon to nitrile and carboxylic acid. The catalyst contains chemically bound oxygen so that the generic formula can be written as 100 MoO$_3$, 10–100 TeO$_2$, 5–100 Mn$_2$P$_2$O$_7$.

Among the suitable supports are silica, silica-containing materials, such as diatomaceous earth, kieselguhr, silicon carbide, clay, aluminum oxides and even carbon, although the latter tends to be consumed during the reaction.

A useful catalyst is one having a ratio of 100 MoO$_3$, 33.25 TeO$_2$ and 33.24 Mn$_2$P$_2$O$_7$ because it gives the high yields of desired products, and the preferred support is silica, because of its low cost and good fluidizing characteristics.

REACTION CONDITIONS

The reaction can be carried out in either a fixed or fluidized catalyst bed.

The reaction temperature can range from about 375 to 500° C. but the preferred range is from about 400 to about 480° C. Below 375° C. the conversion of monoolefin per pass and yield of unsaturated derivatives is lower than desirable. Usually, a longer contact time is needed at lower temperatures to obtain the yields of unsaturated nitriles obtainable at temperatures in the optimum range.

Above 480° C. some of the acrylonitrile appears to be oxidized to carbon oxides, acetonitrile and HCN. This is much more apparent at 500° C.

The ratio of oxygen to propylene should be from 1.5 to 1 and preferably from 2 to 1 to 4 to 1 for good conversion and yields, but ratios with some excess oxygen, 33 to 100% is even more desirable and is preferred. There is no critical upper limit as to the amount of oxygen, but when air is used as the oxygen-containing gas it becomes apparent that too great an excess will require large reactors, pumping, compressing and other auxiliary equipment for any given amount of desired end product. It is therefore best to limit the amount of air to provide 33 to 66% excess of oxygen. This range provides the largest proportion of desired products, under given reaction conditions. Also, since care is needed to avoid an explosive mixture the limiting of air aids in that direction. The mol ratio of ammonia to propylene can range from about 0.5 to 1 to about 1.75 to 1. A preferred ratio is 0.75 to 1.5 of ammonia per mol of propylene or isobutylene. At molar ratios of 0.5 to 1 of ammonia, substantial amounts of acids are formed, which at molar ratios of about 1 to 1.75 or more, nitriles are the primary product.

The molar ratio of steam, if used, to propylene can range from 0 to about 8, but best results are obtained with molar ratios of about 3 to 5 per mol of propylene and for this reason are preferred.

The contact time can vary considerably in the range of about 2 to 70 seconds. Best results are obtained in a range of about 8 to 54 seconds and this range is preferred.

Satisfactory particle size catalyst for fixed bed systems is 10–18 mesh (U.S. Sieve) and for fluid bed systems 80–325 mesh.

The reaction can be run at atmospheric pressure, in a partial vacuum or under induced pressure up to 50–100 p.s.i. Atmospheric pressure is preferred for fixed bed systems and a pressure of 1 to 50 p.s.i. for fluid bed reactions. Care is needed to operate at a pressure which is below the dew point pressure of the acrylonitrile or methacrylonitrile at the reaction temperature. It is possible to obtain efficiencies of 58.6 to 86.4% for acrylonitrile, depending on the type of catalyst, the reactant ratios and the reaction conditions. The yields and efficiencies of methacrolein from isobutylene are not as high as those of acrolein from propylene, but it is surprising that efficiencies of from 30.9 to 48% can be obtained, because it is generally known that isobutylene is much more difficult to convert to a nitrile than is propylene.

A desirable catalyst for preparing acrylonitrile is one with a molar ratio of 75 MoO$_3$, 25 TeO$_2$ and 15 Mn$_2$P$_2$O$_7$, because it provides good efficiency in converting propylene to the unsaturated nitrile. For the preparation of methacrylonitrile a good catalyst has a molar ratio of 75 MoO$_3$, 25 TeO$_2$ and 25 Mn$_2$P$_2$O$_7$.

The examples are intended to illustrate the invention but not to limit it.

Example I

The catalyst in this example was prepared by Procedure III described above. It contained a molar ratio of 75 MoO$_3$, 25 TeO$_2$ and 15 Mn$_2$P$_2$O$_7$ and was unsupported. A high silica glass (Vycor) tube 12 inches long and 30 mm. in outer diameter was filled with 170 ml. of the catalyst. The reactor had three inlets, one for air, one for steam and one for propylene. Three external electrically operated heating coils were wound on the reactor. One of the coils extended along the entire length of the reactor and each of the remaining coils extended about one half the length of the reactor.

Outlet vapors were passed through a short water cooled condenser. Uncondensed gases were passed through a gas chromatograph (Perkin-Elmer Model 154D) and analyzed continuously. The liquid condenser was weighed and then analyzed for its acrylonitrile content in the gas chromatograph.

Steam at a temperature of 200–250° C. was first passed into this fixed bed reactor. Then propylene and air were fed separately into the stream of water vapor. The mixture passed through a pre-heater and entered the reactor at a temperature of 200–250° C. The reactor was preheated to about 300° C. before the gas feed was begun.

The molar ratio of the feed was 3 mols of oxygen (supplied as air) per mol of propylene, 4.25 mols of water per mol of propylene and 1.29 mols of ammonia per mol of propylene. The temperature in the reactor was raised to about 440° C. and held at this temperature during the run. The cold contact time was 38 seconds.

All of the propylene was consumed in the reactor to produce a mol percent yield of 86.4% based on the propylene converted. The efficiency was also 86.4%. No acetonitrile could be detected in the effluent gases.

Example II

The reactor, the conditions for feeding the reaction ingredients into the reactor and the volume of catalyst were the same as those described in Example I. The catalyst had a molar ratio of 75 MoO$_3$, 25 TeO$_2$ and 25 Mn$_2$P$_2$O$_7$. The reactants in a ratio of 2.95 mols of oxygen, supplied as air, 4.2 mols of water and 1.58 mols of ammonia per mol of propylene were passed over the catalyst at a temperature of 430° C. with a cold contact time of 50 seconds. All of the propylene was converted with a yield and efficiency of 74.8% for acrylonitrile. In this example a small amount, 5.75%, of acetonitrile was also formed.

Example III

The feed ratio and amount of catalyst in this example were the same as that described in Example II. The catalyst had a molar ratio of 50 $MoO_3$, 25 $TeO_2$ and 10 of $Mn_2P_2O_7$. The reaction temperature was 435° C. and cold contact time was 50 seconds. All of the propylene was converted, with a yield and efficiency for acrylonitrile of 82.5%. No acetonitrile was detected.

Example IV

The catalyst of this example had a molar ratio of 50 $MoO_3$, 20 $TeO_2$ and 5 $Mn_2P_2O_7$. The amount of catalyst, reactant ratios, and contact time were the same as described in Example II. The temperature was 425° C. All of the propylene was converted with a yield and efficiency for acrylonitrile of 76.1%. No acetonitrile was detected.

Example V

The catalyst had a molar ratio of 75 $MoO_3$, 25 $TeO_2$ and 10 of $Mn_5(P_3O_{10})_2$. The ratio of reactants, amount of catalyst and contact time were the same as those of Example II. The reaction at 422° C. converted 87.1% of the propylene with a yield of 74.3% of acrylonitrile for an efficiency of 64.7%. At 440° C., 93.67% of the propylene was converted with a yield of 86.7% acrylonitrile for an efficiency of 77.4%.

Example VI

The ratios of reactants and contact time were the same as described in Example II. The reaction was run using 170 ml. of a catalyst having a molar ratio of 75 $MoO_3$, 25 $TeO_2$ and 25 $(Mn)_3(PO_4)_2$. At 425° C., all of the propylene was converted, with a yield of 64.5% of acrylonitrile.

Example VII

In this example isobutylene was used in place of propylene.

The catalyst and volume thereof were the same as described in Example II. The data obtained are set out below.

| $O_2/C_4H_8$ | $H_2O/C_4H_8$ | $NH_3/C_4H_8$ | Contact Time, sec. | Temp., ° C. | Mol Percent Conv., $C_4H_8$ | Mol Percent Yield, $C_4H_5N$ | Mol Percent Efficiency |
|---|---|---|---|---|---|---|---|
| 3.0 | 3.85 | 1.46 | 25 | 460 | 88.2 | 35.0 | 30.2 |
| 3.5 | 3.85 | 1.46 | 21 | 480 | 100 | 48.0 | 48.0 |

This example shows that good yields of methacrylonitrile can be obtained with the catalysts of this invention.

Results obtained in a fluidized bed are comparable to that of the fixed bed.

The yield of desired nitrile is slightly lower with supported catalysts than with unsupported catalysts in both the fixed and fluid bed procedures.

One of the particular and unexpected advantages of the process of the invention is the discovery that substantial amounts of acids and nitriles, as acrylic acid and acrylonitrile, can be simultaneously produced and thereafter readily separated. Both acrylic acid and acrylonitrile are important commercial materials and improved processes for their manufacture are desired. That the same catalyst and equipment may be used to produce these two materials at the same time is of substantial economic value. As is known, more economical operations in the process industry are generally obtained with larger equipment, and, in accordance with this invention, both acrylic acid and acrylonitrile can be produced in commercial amounts simultaneously in the same equipment, and a more economic unit may be built and used. Thus, substantial savings are obtained as compared to separate plants for making these two materials.

In order to obtain substantial amounts of both acrylic or methacrylic acid and acrylonitrile or methacrylonitrile from propylene or isobutylene, the molar ratio of ammonia to monoolefin is preferably maintained at less than about 1 mol down to about ½ mol. Usually, when amounts of ammonia greater than 1 mol are used the yield of acrylic acid is decreased substantially, and the yield of acrylonitrile high. In the range of about 0.4 to 0.9 mol of ammonia per mol of monoolefin, substantial amounts, in economic yields, of both acids and nitrile are obtained.

A series of runs to demonstrate the simultaneous production of acrylic acid and acrylonitrile were made. In the equipment described in Example I and with the catalyst of Example II, the results obtained in the several runs are set forth below.

| Run | Temp., ° C. | Contact Time, sec. | $NH_3$ Mol | Conversion, Percent | Yield Percent Acrylic Acid | Yield Percent Acrylonitrile |
|---|---|---|---|---|---|---|
| 1 | 418 | 20 | 0.77 | 100 | 37.54 | 35.46 |
| 2 | 427 | 39 | 0.58 | 100 | 33.48 | 33.48 |
| 3 | 435 | 31 | 0.75 | 100 | 22.39 | 47.67 |
| 4 | 450 | 41 | 0.77 | 100 | 22.67 | 50.0 |
| 5 | 450 | 40 | 0.97 | 100 | 17.9 | 60.2 |

For the purpose of this invention the propylene and isobutylene hydrocarbons employed can be defined by the formula

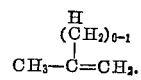

It is apparent that the desired end products result from the reaction of only one methyl group on the hydrocarbon molecule, while the terminal $CH_2=C<$ group remains intact.

The nitriles produced can be defined as alpha, beta monoolefinically unsaturated nitriles having 3 to 4 carbon atoms and a terminal $CH_2=C<$ group or they can be defined by the general formula

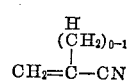

and the acids as

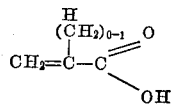

The method of impregnating a silicic carrier with individual ingredients of the catalyst system and thereafter combining the so impregnated carriers to complete the catalyst preparation is disclosed and claimed in patent application No. 380,683, filed July 6, 1964, in the name of T. L. Kang.

I claim:
1. A method of producing compounds of the formula

$$CH_3-\underset{\underset{(CH_2)_{0-1}}{|}}{\overset{H}{C}}=CN$$ 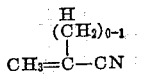

which comprises passing oxygen, ammonia and hydrocarbon of the formula $$CH_3-\underset{\underset{(CH_2)_{0-1}}{|}}{\overset{H}{C}}=CH_2$$ 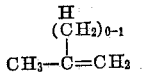

in a molar ratio of one mol of hydrocarbon, about 1.5 to 4 mols of oxygen and about 0.5 to 1.75 mols of ammonia over a catalyst consisting essentially of molybdenum oxide, tellurium oxide and a managanese phosphate in a molar ratio of 100 $MoO_3$, 10–100 $TeO_2$ and 5–100 of manganese phosphate, at a temperature from about 375° C. to about 500° C. and a contact time of about 2 to 70 seconds.

2. The method of claim 1 wherein propylene, air, ammonia and water are present in a ratio of 1 mol of propylene, sufficient air to provide from about 2 to 4 mols of oxygen, up to about 8 mols of water, and from about 0.5 to about 1.75 mols of ammonia, and the temperature is about 400° C. to about 480° C. at a contact time of 8 to 54 seconds.

3. The method of claim 2 wherein there is present about 0.75 to 1.5 mols of ammonia and 3 to 5 mols of water per mol of hydrocarbon.

4. The method of claim 3 wherein the catalyst consists essentially, on a molar basis, of about 75 $MoO_3$, 25 $TeO_2$ and 15 to 25 $Mn_2P_2O_7$.

5. The method of claim 1 wherein the hydrocarbon is isobutylene, present with air, ammonia and water in a ratio of 1 mol of isobutylene, sufficient air to provide from about 2 to 4 mols of oxygen, up to about 8 mols of water and from about 0.5 to about 1.75 mols of ammonia per mol of isobutylene at a temperature of about 400° C. to about 480° C. and a contact time of 8 to 54 seconds.

6. The method of claim 5 wherein there is present about 0.75 to 1.5 mols of amomnia and 3 to 5 mols of water per mol of hydrocarbon.

7. The method of claim 1 wherein there are concurrently produced compounds of the formula

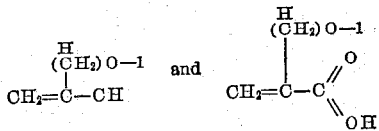

wherein the molar ratio of ammonia is from about 0.4 to about 0.9 mol.

8. The method of claim 7 wherein propylene, air, ammonia and water in a ratio of 1 mol of propylene, sufficient air to provide from about 2 to 4 mols of oxygen, up to about 8 mols of water vapor, and from about 0.4 to 0.9 mol of ammonia per mol of propylene are passed over the catalyst at a temperature of about 400° C. to about 480° C. and a contact time of 8–54 seconds.

9. The method of claim 7 wherein isobutylene, air ammonia and water in a ratio of 1 mol of isobutylene, sufficient air to provide from about 2 to 4 mols of oxygen, and from about 0.4 to 0.9 mol of ammonia are passed over the catalyst at a temperature of about 400° C. to about 480° C. and a contact time of 8 to 54 seconds.

References Cited
UNITED STATES PATENTS

| | | | |
|---|---|---|---|
| 3,009,943 | 11/1961 | Hadley et al. | 260—465.3 |
| 3,135,783 | 6/1964 | Sennewald et al. | 260—465.3 |
| 3,200,081 | 8/1965 | Callahan et al. | 260—465.3 |

FOREIGN PATENTS

| | | |
|---|---|---|
| 1,255,121 | 1/1961 | France. |
| 1,269,382 | 7/1961 | France. |

CHARLES B. PARKER, *Primary Examiner.*

JOSEPH P. BRUST, *Examiner.*

UNITED STATES PATENT OFFICE
CERTIFICATE OF CORRECTION

Patent No. 3,335,169                                August 8, 1967

Jamal S. Eden

It is hereby certified that error appears in the above numbered patent requiring correction and that the said Letters Patent should read as corrected below.

Column 8, lines 6 to 11, the formulas should appear as shown below instead of as in the patent:

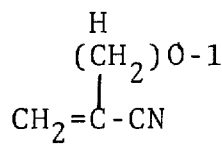     and     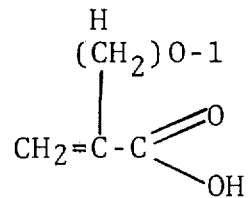

Signed and sealed this 24th day of September 1968.

(SEAL)
Attest:

Edward M. Fletcher, Jr.
Attesting Officer

EDWARD J. BRENNER
Commissioner of Patents